(12) United States Patent
Ichimura et al.

(10) Patent No.: US 11,493,742 B2
(45) Date of Patent: Nov. 8, 2022

(54) ZOOM LENS, IMAGE PICKUP APPARATUS, AND LENS APPARATUS

(71) Applicant: CANON KABUSHIKI KAISHA, Tokyo (JP)

(72) Inventors: Junya Ichimura, Utsunomiya (JP); Masato Katayose, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 286 days.

(21) Appl. No.: 16/741,024

(22) Filed: Jan. 13, 2020

(65) Prior Publication Data

US 2020/0233191 A1 Jul. 23, 2020

(30) Foreign Application Priority Data

Jan. 23, 2019 (JP) .............................. JP2019-008874

(51) Int. Cl.
| | |
|---|---|
| *G02B 15/14* | (2006.01) |
| *G02B 15/20* | (2006.01) |
| *G02B 13/18* | (2006.01) |
| *G02B 9/64* | (2006.01) |
| *G02B 15/24* | (2006.01) |

(52) U.S. Cl.
CPC .............. *G02B 15/20* (2013.01); *G02B 9/64* (2013.01); *G02B 13/18* (2013.01); *G02B 15/1461* (2019.08); *G02B 15/14* (2013.01); *G02B 15/146* (2019.08); *G02B 15/24* (2013.01)

(58) Field of Classification Search
CPC ...... G02B 15/20; G02B 15/1461; G02B 9/64; G02B 13/18; G02B 15/14; G02B 15/146; G02B 15/24

USPC ........ 359/676, 683–686, 708, 740, 754, 755
See application file for complete search history.

(56) References Cited

U.S. PATENT DOCUMENTS

| | | | | |
|---|---|---|---|---|
| 2005/0259330 | A1* | 11/2005 | Neil | G02B 15/142 359/676 |
| 2012/0026602 | A1* | 2/2012 | Uchida | G02B 27/646 359/684 |
| 2012/0081790 | A1 | 4/2012 | Yasui | |
| 2013/0120640 | A1* | 5/2013 | Taki | H04N 5/225 359/684 |
| 2015/0338622 | A1* | 11/2015 | Kuzuhara | H04N 5/23296 359/683 |
| 2016/0209632 | A1 | 7/2016 | Imaoka | |

(Continued)

FOREIGN PATENT DOCUMENTS

| | | |
|---|---|---|
| CN | 102782555 A | 11/2012 |
| CN | 109143556 A | 1/2019 |

(Continued)

*Primary Examiner* — Evelyn A Lester (74) *Attorney, Agent, or Firm* — Canon U.S.A., Inc. IP Division (57) ABSTRACT

Provided is a zoom lens including, from an object side to an image side: a first lens unit having a positive refractive power; a second lens unit having a negative refractive power; a third lens unit having a positive refractive power; a fourth lens unit having a negative refractive power; a fifth lens unit having a positive refractive power; a sixth lens unit having a negative refractive power; a seventh lens unit having a positive refractive power; and an eighth lens unit having a negative refractive power, in which an interval between each pair of adjacent lens units is changed for zooming.

20 Claims, 10 Drawing Sheets

(56) References Cited

U.S. PATENT DOCUMENTS

| | | | |
|---|---|---|---|
| 2018/0074300 A1 | 3/2018 | Gyoda et al. | |
| 2019/0004296 A1* | 1/2019 | Sugita | G02B 15/20 |
| 2019/0064491 A1* | 2/2019 | Sugita | G02B 13/02 |
| 2020/0174234 A1* | 6/2020 | Katayose | G02B 15/1461 |
| 2021/0003832 A1* | 1/2021 | Katayose | G02B 15/20 |
| 2021/0033835 A1* | 2/2021 | Nakahara | G02B 15/1461 |
| 2021/0055531 A1* | 2/2021 | Nakazawa | H04N 5/23209 |
| 2021/0096342 A1* | 4/2021 | Nakahara | G02B 15/1451 |
| 2021/0132345 A1* | 5/2021 | Nishioka | G02B 15/1461 |
| 2021/0333524 A1* | 10/2021 | Hagiwara | G02B 15/16 |

FOREIGN PATENT DOCUMENTS

| | | | | |
|---|---|---|---|---|
| EP | 3660570 | * | 11/2019 | G02B 15/14 |
| JP | H11-84241 A | | 3/1999 | |
| JP | 2014-209144 A | | 11/2014 | |
| JP | 2014-228734 A | | 12/2014 | |
| JP | 2016-057387 A | | 4/2016 | |

* cited by examiner

ZOOM LENS, IMAGE PICKUP APPARATUS, AND LENS APPARATUS

BACKGROUND OF THE INVENTION

Field of the Invention

The aspect of the embodiments relates to a zoom lens. The zoom lens is suitable for an image pickup apparatus using an image pickup element, for example, a digital video camera, a digital still camera, a broadcasting camera, or a monitoring camera.

Description of the Related Art

There is known what is called a super telephoto zoom lens having a long focal length at a telephoto end and a high zoom ratio. Such a zoom lens is required to have high optical performance, easily perform rapid focusing, and be compact as the entire system of the zoom lens for the focal length at the telephoto end, while having the high zoom ratio.

In Japanese Patent Application Laid-Open No. H11-84241, there is disclosed a zoom lens consisting of, in order from an object side to an image side, first to sixth lens units having positive, negative, positive, negative, positive, and negative refractive powers, in which two lens units are configured to move for focusing.

Also in Japanese Patent Application Laid-Open No. 2014-228734, there is disclosed a zoom lens consisting of, in order from an object side to an image side, first to sixth lens units having positive, negative, positive, negative, positive, and negative refractive powers, in which a back focus is reduced so that the zoom lens has a relatively reduced total length.

A linear actuator is known as an actuator with which rapid focusing can be performed, but it is required that a focus lens unit have a light weight for driving. Further, when floating focus is adopted to obtain good optical performance over the entire focus range in a zoom lens having a high zoom ratio, a configuration of an actuator having high driving force and a complicated metal cam is required. Further, also in for zooming and focusing, a degree of freedom of movement may be limited by a locus of the cam.

In order to obtain high optical performance over the entire focus range while downsizing the entire system in a zoom lens, it is required to appropriately set elements forming the zoom lens. It is required to appropriately set a zoom type (for example, the number of lens units, and refractive powers and movement conditions for zooming of the lens units), a choice of a lens unit configured to move for focusing, and a lens configuration of the lens unit configured to move for focusing, for example.

SUMMARY OF THE INVENTION

According to at least one embodiment of the disclosure, there is provided a zoom lens including, in order from an object side to an image side: a first lens unit having a positive refractive power; a second lens unit having a negative refractive power; a third lens unit having a positive refractive power; a fourth lens unit having a negative refractive power; a fifth lens unit having a positive refractive power; a sixth lens unit having a negative refractive power; a seventh lens unit having a positive refractive power; and an eighth lens unit having a negative refractive power, wherein an interval between each pair of adjacent lens units is changed for zooming.

Further features of the disclosure will become apparent from the following description of exemplary embodiments with reference to the attached drawings.

DESCRIPTION OF THE EMBODIMENTS

Now, exemplary embodiments of the disclosure are described with reference to the attached drawings.

A zoom lens according to each of Embodiments of the disclosure consists of, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, a sixth lens unit having a negative refractive power, a seventh lens unit having a positive refractive power, and an eighth lens unit having a negative refractive power. Further, an interval between each pair of adjacent lens units is changed for zooming.

FIG. 1, FIG. 3, FIG. 5, and FIG. 7 are lens cross-sectional views of zoom lenses according to Embodiments 1 to 4 of the disclosure at a wide angle end (short focal length end), respectively. FIG. 2A and FIG. 2B, FIG. 4A and FIG. 4B, FIG. 6A and FIG. 6B, and FIG. 8A and FIG. 8B are aberration diagrams of the zoom lenses according to Embodiments 1 to 4 when the zoom lenses are focused at infinity, respectively. In each set of the aberration diagrams, aberrations at the wide angle end and a telephoto end (long focal length end) of the zoom lens are illustrated in order from above. Embodiment 1 relates to a zoom lens having a zoom ratio of 4.80 and an aperture ratio (f-number) of from about 4.60 to about 7.20. Embodiment 2 relates to a zoom lens having a zoom ratio of 4.80 and an aperture ratio of from about 4.10 to about 6.40. Embodiment 3 relates to a zoom lens having a zoom ratio of 4.92 and an aperture ratio of from about 4.60 to about 7.20.

Figure 7:
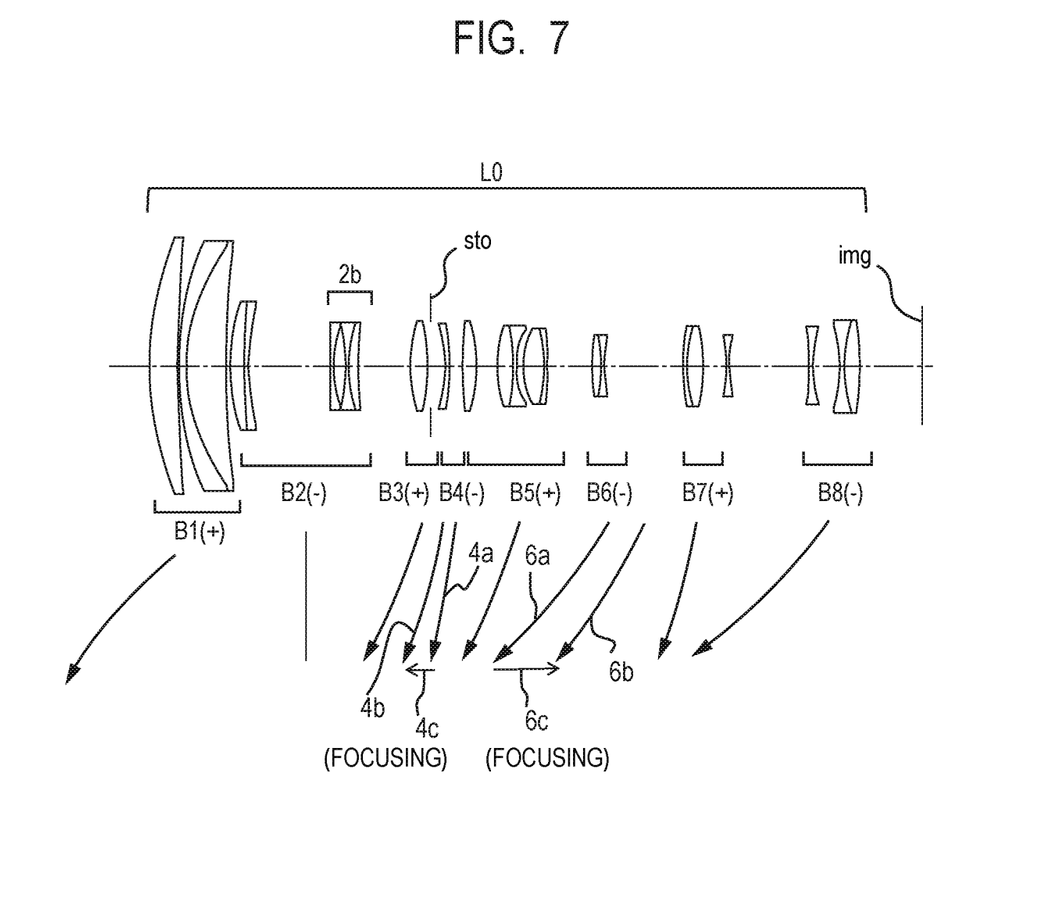
FIG. 7 is a lens cross-sectional view of a zoom lens according to Embodiment 4 of the disclosure.
Figure 8A:
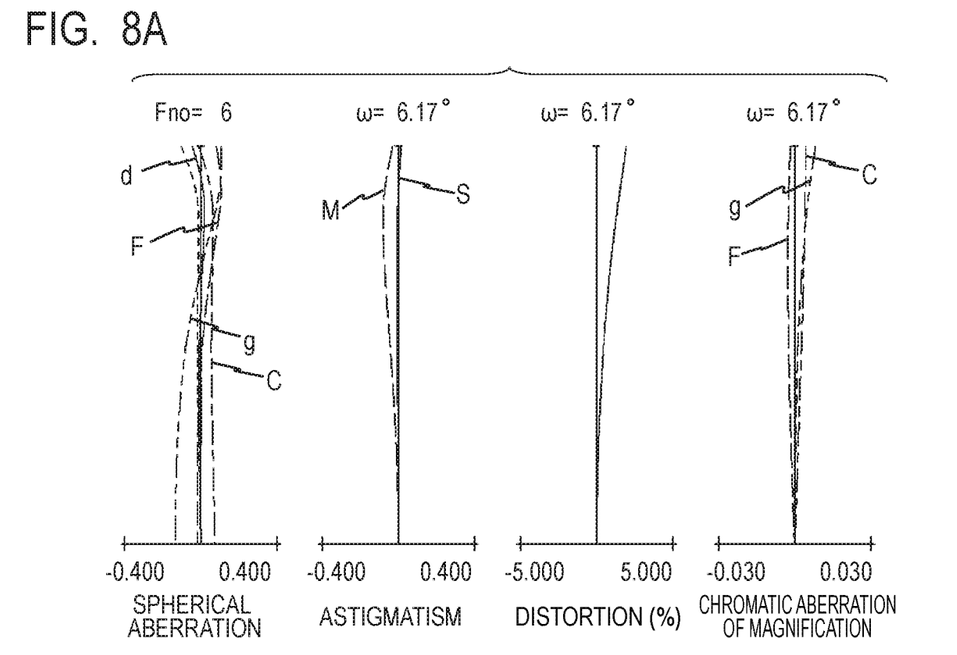
FIG. 8A and FIG. 8B are aberration diagrams of the zoom lens according to Embodiment 4 of the disclosure.
Figure 8B:
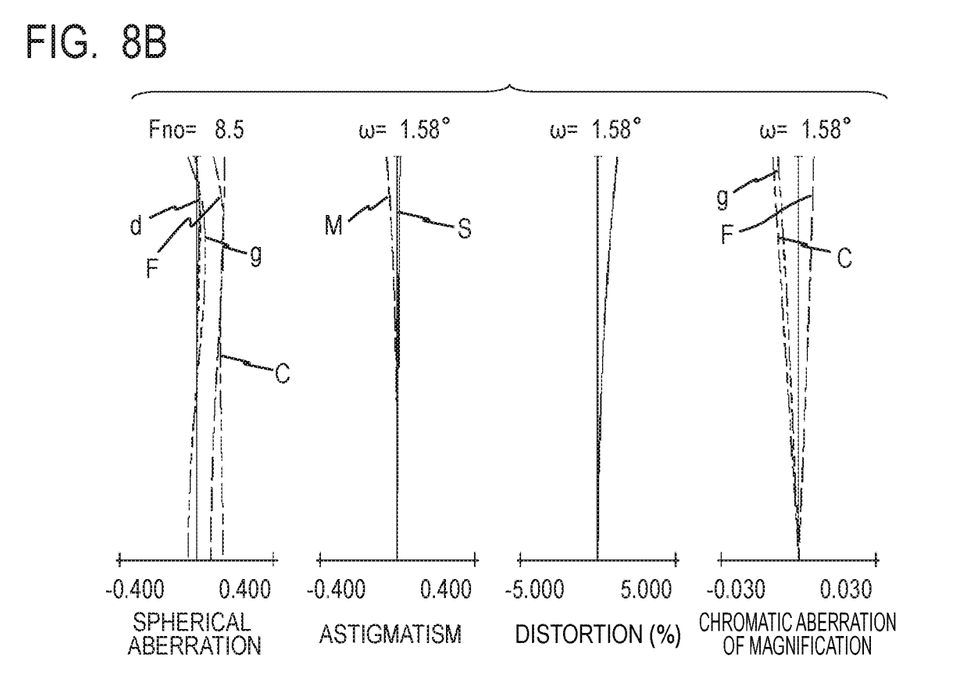

Embodiment 4 relates to a zoom lens having a zoom ratio of 3.92 and an aperture ratio of from about 6.00 to about 8.50.

Figure 9:
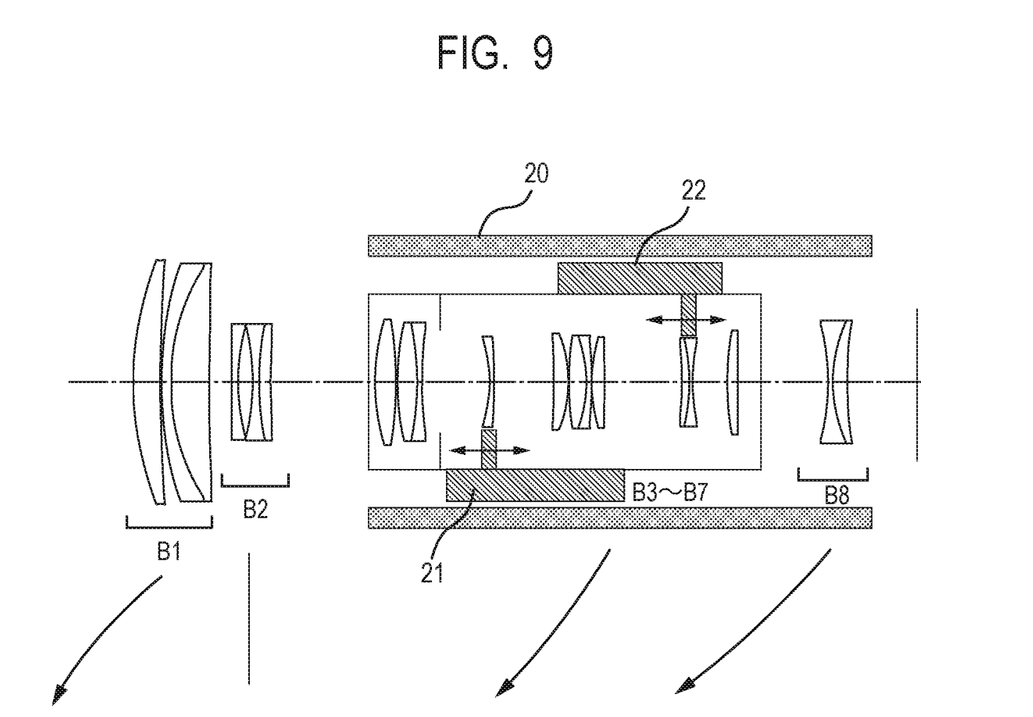
FIG. 9 is a view for illustrating a configuration of a lens apparatus including the zoom lens according to Embodiment 1 of the disclosure.

FIG. 9 is an explanatory view of movements of respective lens units of the zoom lens according to Embodiment 1.

Figure 10:
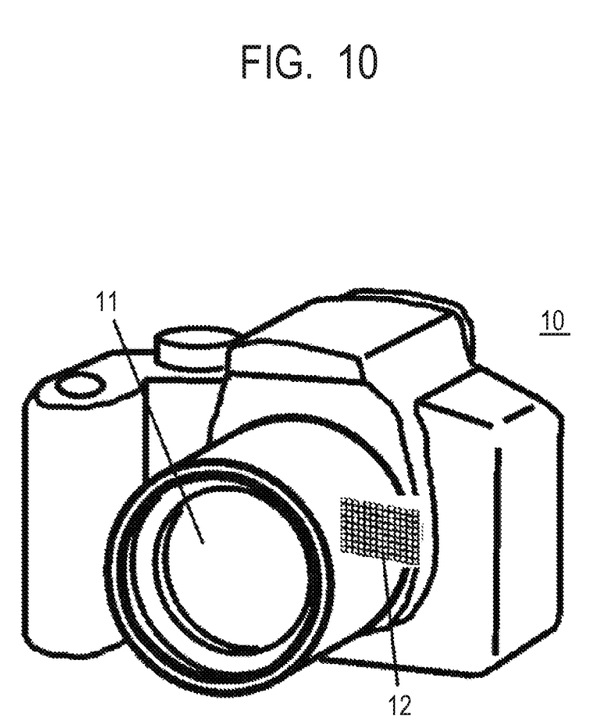
FIG. 10 is a schematic view of a main part of an image pickup apparatus according to an example of the disclosure.

FIG. 10 is a schematic view of a main part of an image pickup apparatus according to an embodiment of the disclosure.

The zoom lens according to each of Embodiments is an image pickup optical system to be used for an image pickup apparatus, for example, a video camera, a digital still camera, a monitoring camera, and a TV camera. The zoom lens according to each of Embodiments can also be used as a projection optical system for a projection apparatus (projector). In the lens cross-sectional views, the left side is the object side (front), and the right side is the image side (rear). Further, in the lens cross-sectional views, the zoom lens is represented by L0. When the order of a lens unit from the object side is represented by "i", the i-th lens unit is represented by Bi.

An aperture stop ST0 is configured to determine (restrict) light fluxes at an open f-number (Fno). At an image plane "img", an image pickup surface of an image pickup element (photoelectric conversion element), for example, a CCD sensor or a CMOS sensor, is placed when the zoom lens is used as an image pickup optical system of a video camera or a digital still camera. The arrows indicate movement loci of the respective lens units for zooming from the wide angle end to the telephoto end. The arrow relating to "focusing" indicates a direction of movement of the lens unit for focusing from infinity to close distance.

The solid-line arrows 4a and 6a indicate movements of lens units for zooming from the wide angle end to the telephoto end when an object distance is infinity, and the broken-line arrows 4b and 6b indicate movements of the lens units for zooming from the wide angle end to the telephoto end when focusing on the close object distance.

The aberration diagrams include a spherical aberration diagram, an astigmatism diagram, a distortion diagram, and a chromatic aberration diagram in order from the left of the drawing sheet. In the spherical aberration diagram, the solid line "d" indicates an aberration of a d-line (wavelength: 587.56 nm), the broken line "f" indicates an aberration of an f-line (wavelength: 486.13 nm), the one-dot chain line C indicates an aberration of a C-line (wavelength: 656.27 nm), and the two-dot chain line "g" indicates an aberration of a g-line (wavelength: 435.83 nm). The scale on the horizontal axis indicates a defocus amount, and is from −0.4 mm to +0.4 mm.

In the astigmatism diagram, the solid line S indicates curvature of field with respect to a sagittal image plane of the d-line, and the dotted line M indicates curvature of field with respect to a meridional image plane of the d-line. The horizontal axis is the same as in the spherical aberration diagram. In the distortion diagram, the scale on the horizontal axis is from −5% to +5%. The chromatic aberration diagram indicates a deviation of chromatic aberration of magnification from the d-line, and the scale of the horizontal axis is from −0.03 mm to +0.03 mm.

The zoom lens L0 according to each of Embodiments consists of the above-mentioned eight lens units. In this specification, a "lens unit" may consist of a plurality of lenses or one lens.

The eight lens units forming the zoom lens consist of, in order from the object side to the image side, a first lens unit B1 having a positive refractive power, a second lens unit B2 having a negative refractive power, a third lens unit B3 having a positive refractive power, a fourth lens unit B4 having a negative refractive power, a fifth lens unit B5 having a positive refractive power, a sixth lens unit B6 having a negative refractive power, a seventh lens unit B7 having a positive refractive power, and an eighth lens unit B8 having a negative refractive power. As a result, a zoom lens having a long focal length at the telephoto end and a high zoom ratio can be obtained.

With telephoto optical arrangement of the first lens unit B1 having the positive refractive power and the second lens unit B2 having the negative refractive power, a principal point can be set long with respect to a total length of the zoom lens to reduce the total length of the zoom lens as compared to the focal length.

Further, with the above-mentioned refractive power arrangement, reductions in diameter of lenses and lens units consisting of a relatively small number of lenses can be easily ensured on the image side of the second lens unit. As a result, at least a part of the lens units can be easily reduced in weight, and hence it becomes easier to arrange a focus lens unit configured to move for focusing on the image side of the second lens unit. Further, a driving mechanism can double as a driving mechanism for zooming and a driving mechanism for focusing, and hence in a lens apparatus including the zoom lens according to each of Embodiments, it becomes easier to simplify the driving mechanism.

Further, the first lens unit B1 is configured to move toward the object side for zooming from the wide angle end to the telephoto end, and the fourth lens unit B4 and the sixth lens unit B6 are configured to move for zooming. At the telephoto end as compared to the wide angle end, an interval between the first lens unit B1 and the second lens unit B2 is increased, an interval between the second lens unit B2 and the third lens unit B3 is reduced, and an interval between the seventh lens unit B7 and the eighth lens unit B8 is reduced.

During zooming from the wide angle end to the telephoto end, the interval between the first lens unit B1 and the second lens unit B2 is increased, and the interval between the second lens unit B2 and the third lens unit B3 is reduced. As a result, an action of varying magnification is obtained. Further, for zooming from the wide angle end to the telephoto end, the first lens unit B1 and the third lens unit B3 to the seventh lens unit B7 are configured to move toward the object side. As a result, a role of a compensator is obtained, and the total length of the zoom lens becomes the shortest at the wide angle end.

Further, the interval between the seventh lens unit B7 having the positive refractive power and the eighth lens unit B8 having the negative refractive power can be reduced for zooming from the wide angle end to the telephoto end to obtain a further action of varying magnification. Further, the eighth lens unit B8 can be moved for zooming to reduce variations in chromatic aberration of magnification and other aberrations caused by zooming.

The third lens unit B3 to the seventh lens unit B7 are configured to move toward the object side for zooming.

Further, the third lens unit B3 and the fifth lens unit B5 are moved along the same locus for zooming. As a result, in the lens apparatus including the zoom lens according to each of Embodiments of the disclosure, it is possible to prevent complication of the driving mechanism for zooming.

At least a part of the second lens unit B2 serves as an image stabilizing lens unit configured to move in a direction having a component in a direction that is perpendicular to an optical axis of the zoom lens for correcting image blur. Further, the second lens unit B2 is not moved for zooming. As a result, the zoom lens becomes beneficial in stability of a position of the image stabilizing lens unit and easiness of arranging a driving mechanism configured to drive the second lens unit B2. In Embodiments 1 and 2 illustrated in FIG. 1 and FIG. 3, respectively, the entire second lens unit B2 serves as the image stabilizing lens unit, and in Embodiments 3 and 4 illustrated in FIG. 5 and FIG. 7, a lens subunit 2b forming a part of the second lens unit B2 serves as the image stabilizing lens unit.

Two lens units arranged on the image side of the second lens unit are moved for focusing. Further, the two lens units configured to move for focusing be the fourth lens unit B4 and the sixth lens unit B6, and one of the two lens units serve as a main focus lens unit and the other serve as a floating lens unit.

The sixth lens unit B6 is the main focus lens unit. The sixth lens unit B6 is configured to move so as to reduce an interval with the fifth lens unit B5 during varying magnification from the wide angle end to the telephoto end and assist in varying magnification, and has the function of being moved toward the image side as indicated by the arrow 6c for focusing on from an object at infinity to an object at close distance.

The fourth lens unit B4 is the floating lens unit. The fourth lens unit B4 can control curvature of field at the wide angle end, and spherical aberration and focus movement at the telephoto end. As a result, the fourth lens unit B4 reduces variations in aberrations over the entire zoom range and the entire focus range to obtain high optical performance. The arrow 4c indicates a direction of movement for focusing from infinity to close distance.

Each of the fourth lens unit B4 and the sixth lens unit B6 consists of two or less lenses. As a result, the lens units configured to move for focusing can be reduced in weight to perform rapid focusing. Further, the lens units to be moved have the negative refractive powers as in the case of the fourth lens unit B4 and the sixth lens unit B6 to have relatively small lens diameters and reduced weights.

The third lens unit B3 to the seventh lens unit B7 are lens units having positive, negative, positive, negative, and positive refractive powers to arrange alternately different refractive powers and assist in varying magnification by the subsystems, to thereby obtain the high zoom ratio.

Further, a telephoto zoom lens having high optical performance over the entire zoom range and the entire focus range, which easily performs rapid focusing, is obtained.

Further, FIG. 9 is a view for illustrating a configuration of a lens apparatus including the zoom lens according to Embodiment 1. As illustrated in FIG. 9, at least the third lens unit B3, the fourth lens unit B4, and the fifth lens unit B5 are held by an integral tube barrel, and are integrally moved with the use of a zoom cam 20 (first moving mechanism).

The third lens unit B3, the fourth lens unit B4, and the fifth lens unit B5 tend to have a significant change in optical performance by tilt decentering and parallel decentering. Therefore, when the third lens unit B3, the fourth lens unit B4, and the fifth lens unit B5 are configured as the integral structure, displacement can be reduced, and the good optical performance can be easily maintained. Further, with the integral structure, the mechanical structure can be simplified even with a large number of lens units.

Further, the fourth lens unit B4 is moved by an actuator A 21 (second moving mechanism), and the sixth lens unit B6 is moved by an actuator B 22 (third moving mechanism). With the actuator A 21 and the actuator B 22, the fourth lens unit B4 and the sixth lens unit B6 can be moved along loci that are different from those of the other lens units moved by the zoom cam 20.

As a result, the number of mechanical zoom cams can be reduced to simplify the structure of the lens apparatus. Further, the lens units configured to move for zooming are configured to move for focusing, and hence the driving mechanisms can be doubled, and the structure of the lens apparatus can be simplified. In a configuration in which the actuator A 21 and the actuator B 22 are arranged in a lens barrel portion inside the zoom cam 20, actuator units can be easily and satisfactorily held.

Figure 1:
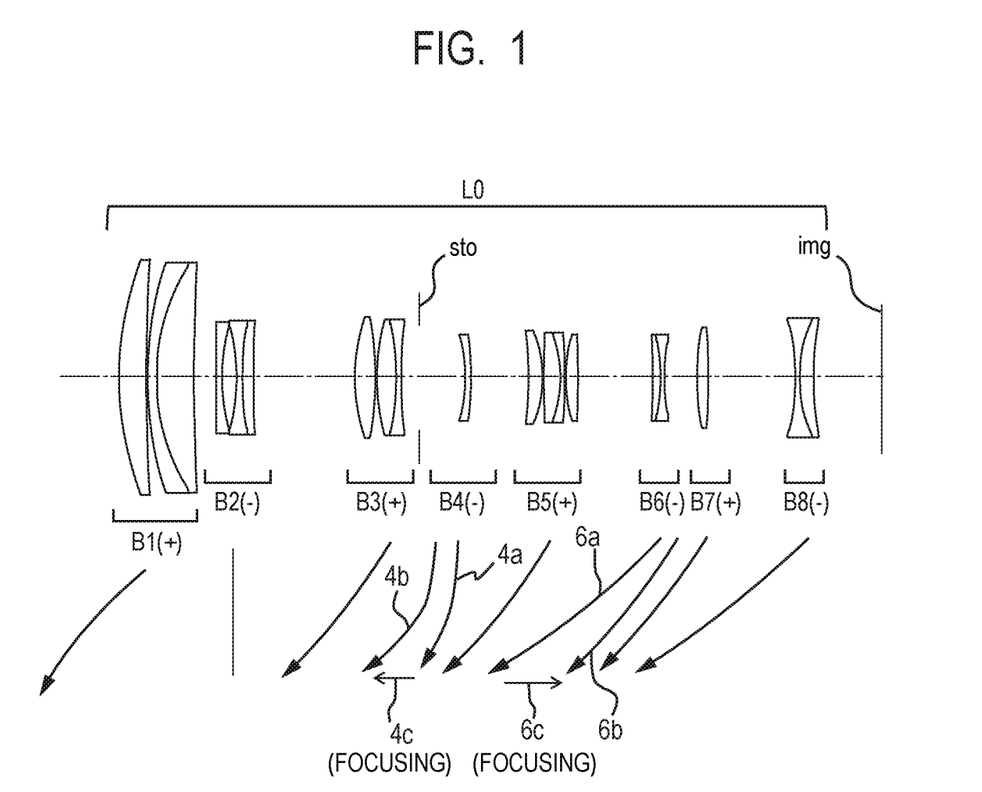
FIG. 1 is a lens cross-sectional view of a zoom lens according to Embodiment 1 of the disclosure.
Figure 2A:
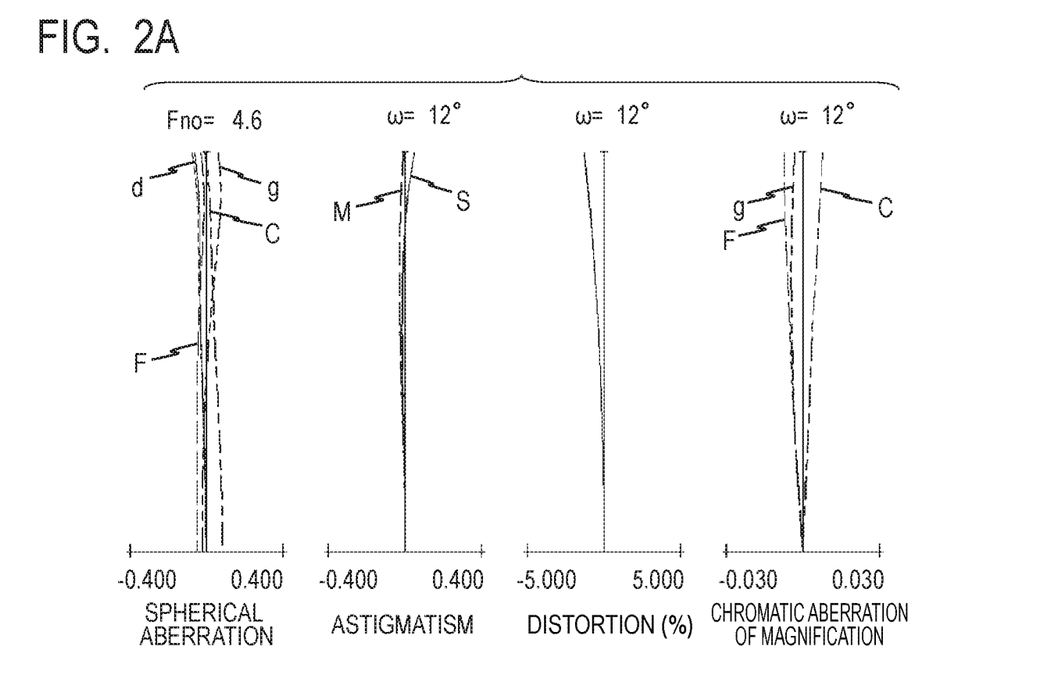
FIG. 2A and FIG. 2B are aberration diagrams of the zoom lens according to Embodiment 1 of the disclosure.
Figure 2B:
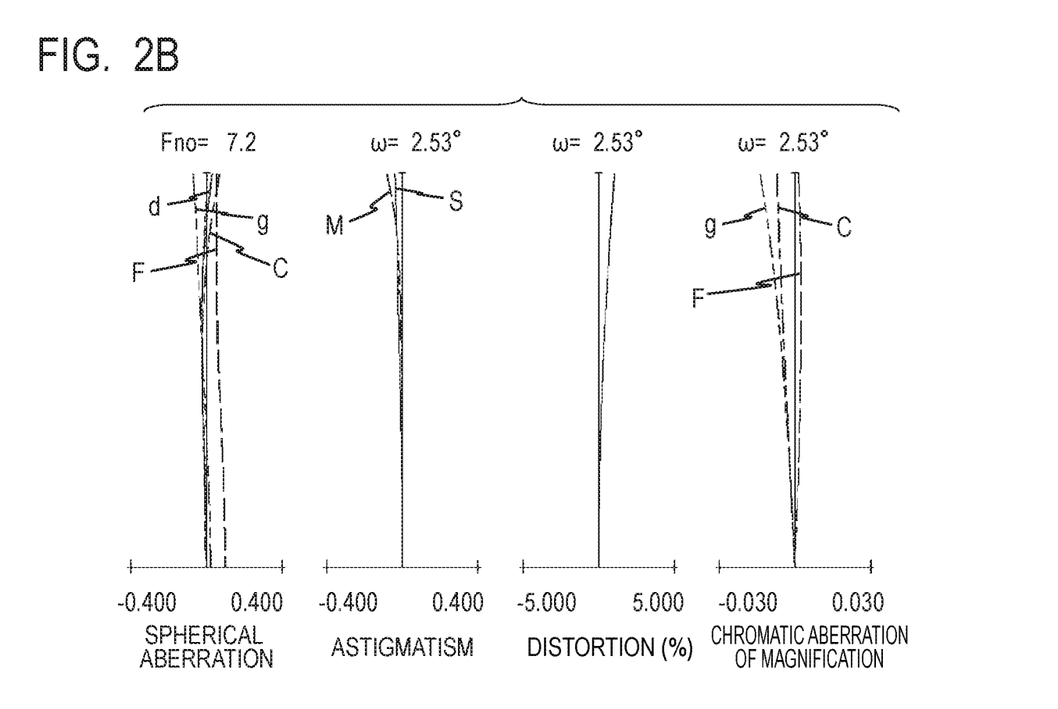
Figure 3:
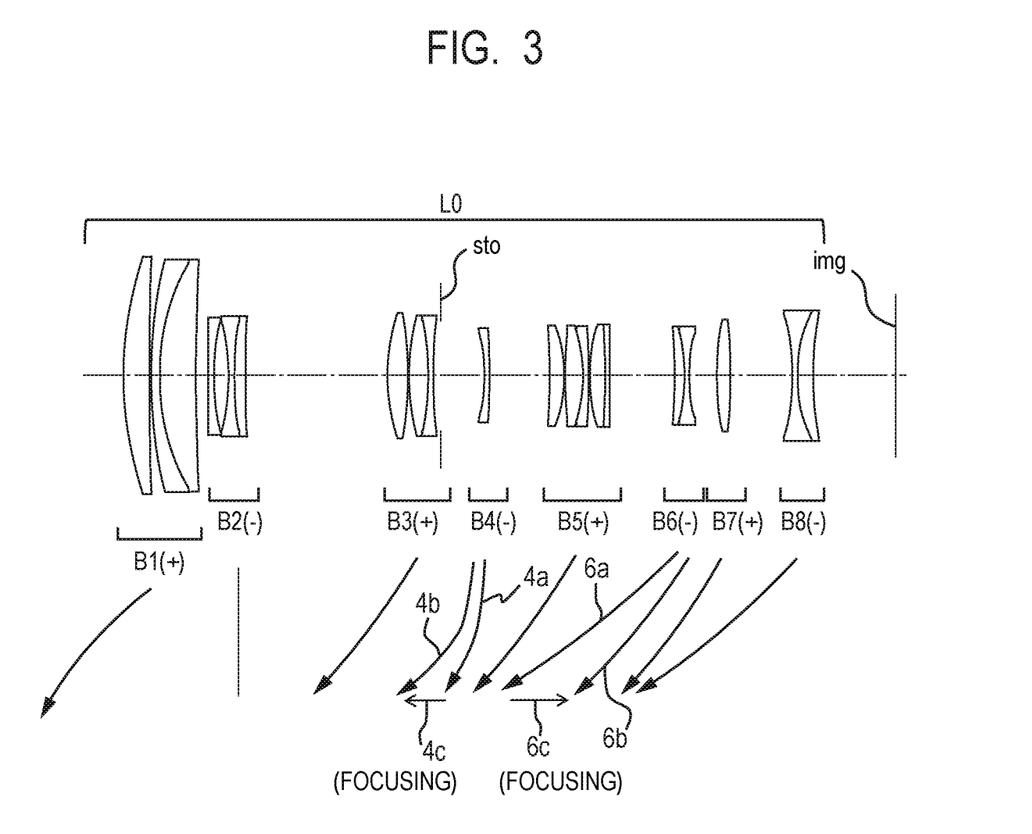
FIG. 3 is a lens cross-sectional view of a zoom lens according to Embodiment 2 of the disclosure.
Figure 4A:
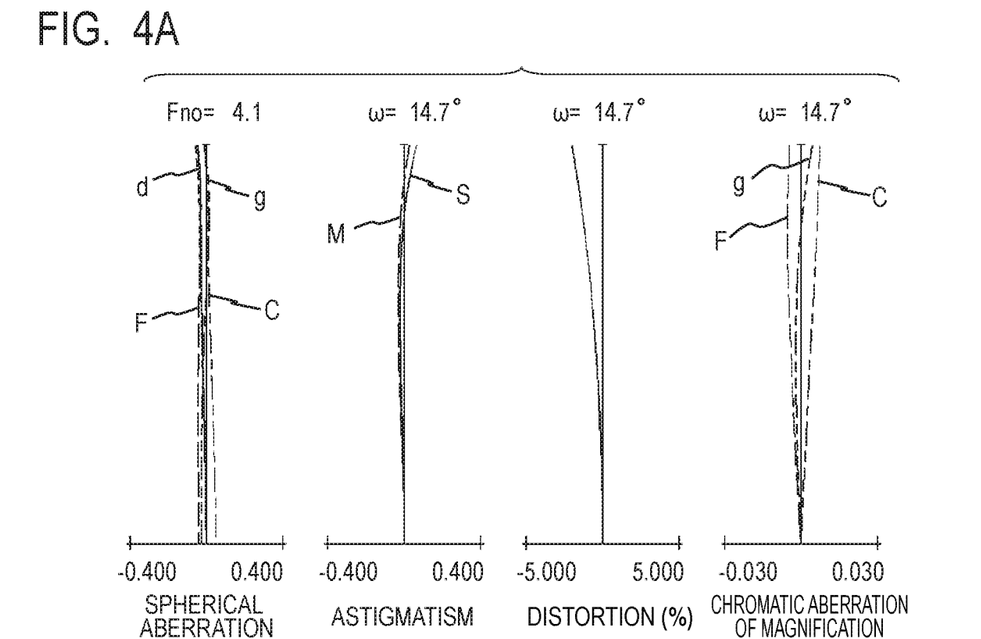
FIG. 4A and FIG. 4B are aberration diagrams of the zoom lens according to Embodiment 2 of the disclosure.
Figure 4B:
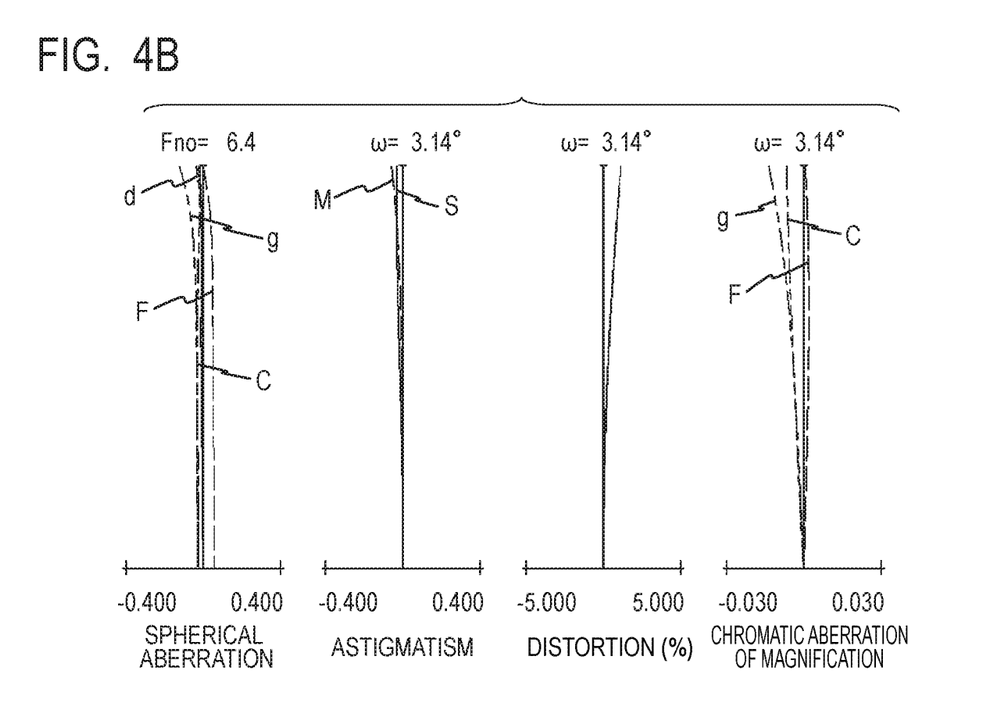
Figure 5:
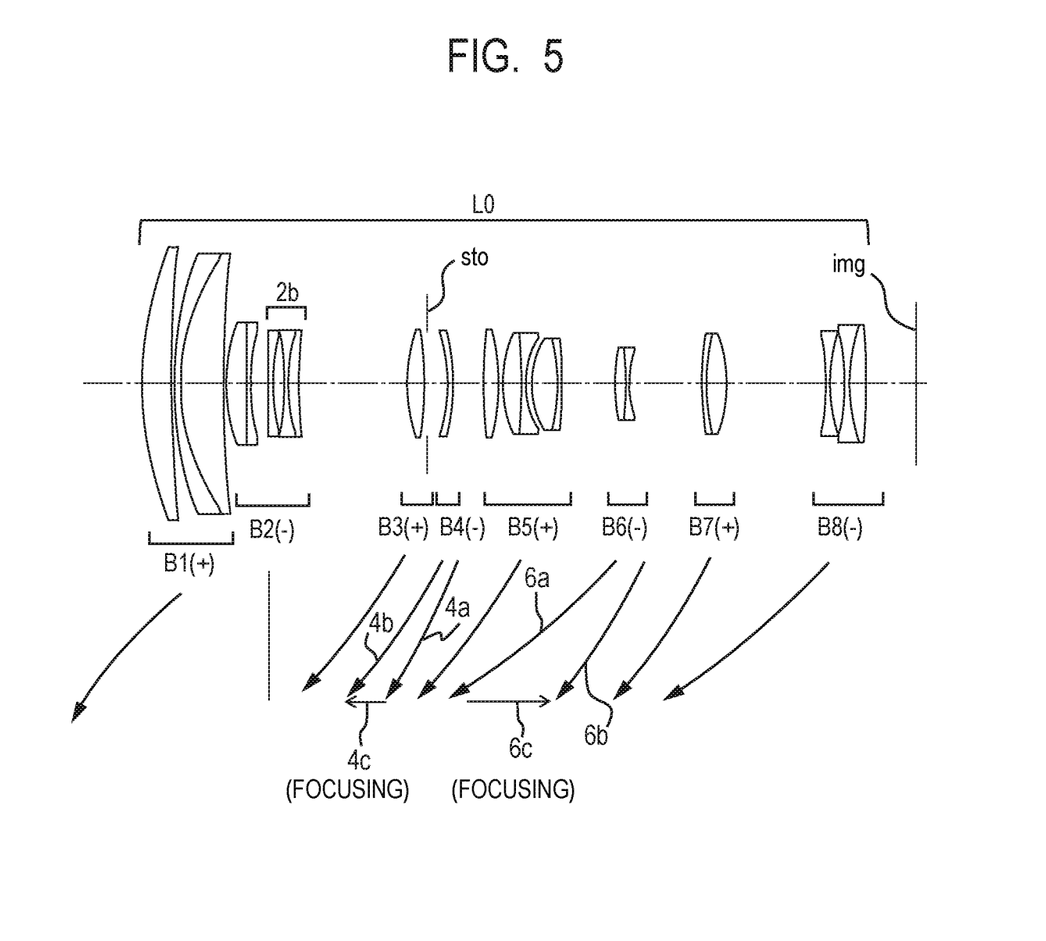
FIG. 5 is a lens cross-sectional view of a zoom lens according to Embodiment 3 of the disclosure.
Figure 6A:
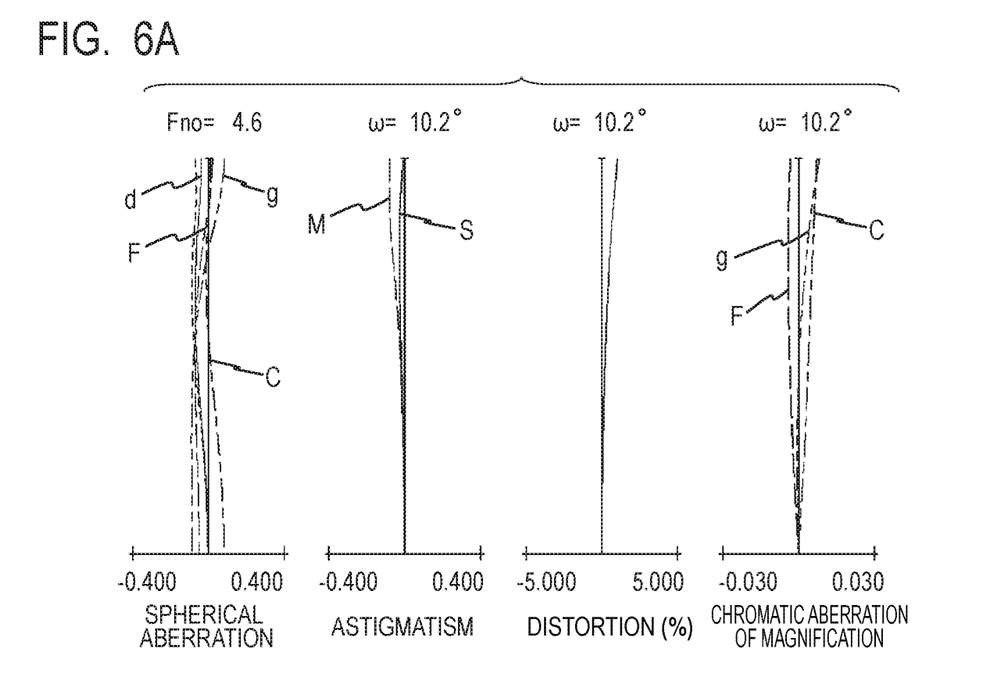
FIG. 6A and FIG. 6B are aberration diagrams of the zoom lens according to Embodiment 3 of the disclosure.
Figure 6B:
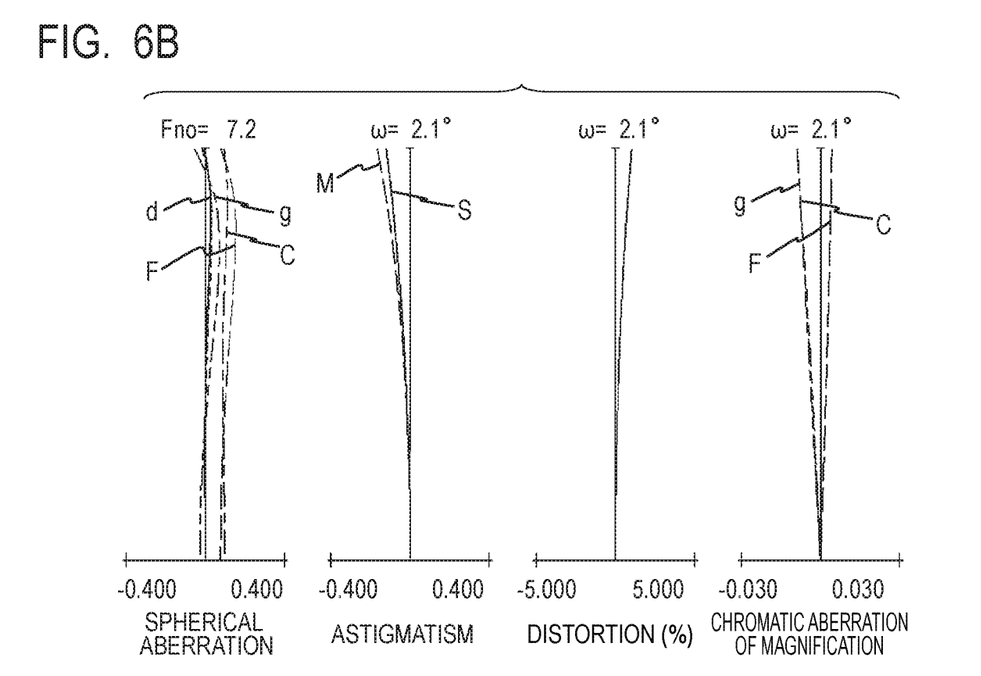

In Embodiment 1 illustrated in FIG. 1 and Embodiment 2 illustrated in FIG. 3, the third lens unit B3 to the seventh lens unit B7 form the integral tube barrel structure, and in Embodiment 3 illustrated in FIG. 5 and Embodiment 4 illustrated in FIG. 7, the third lens unit B3 to the sixth lens unit B6 form the integral structure.

When the seventh lens unit B7 is moved along a different locus, a degree of freedom is increased during zooming, and when the position is finely adjusted from the wide angle end to a middle zoom position and from the middle zoom position to the telephoto end, it becomes easier to correct the aberrations and the focus position more finely.

Further, in the zoom lens according to each of Embodiments, one or more of the following inequalities are satisfied.

$$0.5 < m5/m7 < 1.5 \tag{1}$$

$$1.2 < m8/bfw < 7.0 \tag{2}$$

$$5 < |Es1| < 12 \tag{3}$$

$$0.1 < |Es2/Es1| < 0.8 \tag{4}$$

In the expressions, m5 represents a movement amount of the fifth lens unit B5, and m7 represents a movement amount of the seventh lens unit B7 for zooming from the wide angle end to the telephoto end. A "movement amount of a lens unit" as used herein refers to a difference between positions on the optical axis of the lens unit at the wide angle end and the telephoto end, and the movement amount takes a negative sign when the lens unit is positioned on the object side at the telephoto end as compared to the wide angle end, and a positive sign when the lens unit is positioned on the image side at the telephoto end as compared to the wide angle end. Further in the expressions, "bfw" represents a back focus at the wide angle end, and m8 represents a movement amount of the eighth lens unit B8 for zooming from the wide angle end to the telephoto end.

The fourth lens unit B4 and the sixth lens unit B6 are configured to move for focusing. Of the fourth lens unit B4 and the sixth lens unit B6, one having a higher focus sensitivity serves as a focus lens unit, and the other having a lower focus sensitivity serves as a floating lens unit. Es1 represents a focus sensitivity of the focus lens unit at the telephoto end, and Es2 represents a focus sensitivity of the floating lens unit at the telephoto end when the zoom lens is focused at infinity.

Next, technical meanings of the above-mentioned inequalities are described.

When the ratio m5/m7 falls below the lower limit of the inequality (1), an interval between the fifth lens unit B5 and the seventh lens unit B7 becomes much narrower at the telephoto end, and a movement amount of the sixth lens unit B6, which is the main focus lens unit, is limited to disadvantageously increase close distance at which the zoom lens can be focused, or disadvantageously increase a focusing sensitivity. When the ratio m5/m7 exceeds the upper limit of the inequality (1), the movement amount of the seventh lens unit B7 is reduced, and hence a movement amount of the eighth lens unit B8 is substantially reduced. Then, the effect of correcting aberrations is disadvantageously reduced during zooming, and the sixth lens unit B6 and the seventh lens unit B7 tend to disadvantageously interfere with each other during zooming from the telephoto end to the wide angle end.

When the ratio m8/bfw falls below the lower limit of the inequality (2), the movement amount of the eighth lens unit B8 becomes much smaller with respect to an imaging plane, and it becomes disadvantageously difficult to satisfactorily correct aberrations. When the ratio m8/bfw exceeds the upper limit of the inequality (2), the movement amount of the eighth lens unit B8 becomes much larger, and the total length of the zoom lens becomes disadvantageously longer.

In the zoom lens according to each of Embodiments, when the focus lens units are moved also for zooming, and the movements follow the loci of the lens units with the operation of the actuators without being performed physically by metal cams or the like, a delay in following and a shift in stop position may occur depending on performance of the actuators. Therefore, when the focus sensitivity of the focus lens unit at the telephoto end and at the object distance of infinity is represented by Es1, the inequality (3) is satisfied.

When the value |Es1| falls below the lower limit of the inequality (3), the compensator function during varying magnification is reduced, with the result that it becomes difficult to obtain a high zoom magnification, and to obtain a high magnification at close object distance. When the value |Es1| exceeds the upper limit, a shift in focus due to a shift in position of the actuator tends to exceed an allowable circle of confusion, and accurate focusing becomes difficult.

Meanwhile, when the focus sensitivity is increased, the benefits of achieving the high zoom ratio and the high magnification at close object distance are obtained. Therefore, in order to perform accurate focusing while keeping the focus sensitivity high in the range of the inequality (3), the floating lens unit is used as an auxiliary lens unit. In this application, the focus sensitivities of the focus lens unit and the floating lens unit are appropriately set to sense the shift in focus due to the shift in position of the focus lens unit, with the result that it becomes easier to achieve a configuration in which the shift in focus is corrected by the floating lens unit.

When the ratio |Es2/Es1| falls below the lower limit of the inequality (4), and when a shift in focus due to an error in position of the focus lens unit is assisted by the floating lens unit, a movement amount of the floating lens unit becomes much larger, and curvature of field and spherical aberration are disadvantageously increased. When the ratio |Es2/Es1| exceeds the upper limit of the inequality (4), the focus sensitivities of the focus lens unit and the floating lens unit become much closer, and the effect of assisting by the floating lens unit is reduced.

In one embodiment, the numerical ranges of the inequalities (1) to (4) are set as follows.

$$0.6 < m5/m7 < 1.3 \tag{1a}$$

$$1.8 < m8/bfw < 6.0 \tag{2a}$$

$$6.0 < |Es1| < 11.0 \tag{3a}$$

$$0.15 < |Es2/Es1| < 0.75 \tag{4a}$$

In another embodiment, the numerical ranges of the inequalities (1) to (4) are set as follows.

$$0.7 < m5/m7 < 1.2 \tag{1b}$$

$$2.0 < m8/bfw < 5.0 \tag{2b}$$

$$7.0 < |Es1| < 10.0 \tag{3b}$$

$$0.2 < |Es2/Es1| < 0.5 \tag{4b}$$

The exemplary Embodiments of the disclosure are described above, but the disclosure is not limited to those Embodiments, and can be modified and changed variously within the scope of the gist thereof.

For example, as the lens units configured to move for focusing, at least two lens units of the third lens unit B3 to the seventh lens unit B7, which are arranged along an optical axis direction, are moved.

As described above, according to each of Embodiments, as the zoom lens having the long focal length at the telephoto end and the high zoom ratio, the telephoto zoom lens having the high optical performance over the entire zoom range and the entire focus range, which easily performs rapid focusing, can be obtained.

Now, Numerical Embodiments 1 to 4 corresponding to Embodiments 1 to 4 are provided. In Numerical Embodiments 1 to 4, B represents a lens unit number. S represents a surface number, and indicates the order of an optical surface from the object side. R represents a curvature radius (mm) of the optical surface, "d" represents an interval (mm) between adjacent optical surfaces, "nd" represents a refractive index of a material of an optical member with respect to the d-line, and "vd" represents an Abbe number of the material of the optical member with respect to the d-line.

When refractive indices of the material with respect to the g-line (wavelength: 435.8 nm), the F-line (486.1 nm), the d-line (587.6 nm), and the C-line (656.3 nm) are represented by Ng, NF, Nd, and NC, respectively, an Abbe number "vd" of a material is expressed as: vd=(Nd−1)/(NF−NC). A back focus is represented by BF. The "back focus" is an air-equivalent length of a distance on the optical axis from the last surface (surface closest to the image side) of the zoom lens to the image plane "img". The "total length of zoom lens" is a value obtained by adding the back focus to a distance on the optical axis from the frontmost surface (surface closest to the object side) to the last surface of the zoom lens. "EA" represents an effective diameter, and "obj" represents an object.

Further, values corresponding to the inequalities in Numerical Embodiments 1 to 4 are shown in Table 1.

| (Numerical Embodiment 1) | | | | | |
|---|---|---|---|---|---|
| B | S | EA | R | d | nd | vd |
|   | obj |   |   | 1.00E+030 |   |   |
| 1 | 1 | 68.055 | 99.62096 | 7.70000 | 1.496999 | 81.54 |
|   | 2 | 67.416 | 582.13808 | 0.20000 |   |   |
|   | 3 | 66.165 | 112.90552 | 2.70000 | 1.804000 | 46.58 |
|   | 4 | 63.375 | 62.41363 | 11.00000 | 1.438750 | 94.66 |
|   | 5 | 62.592 | 778.70704 | Variable |   |   |
| 2 | 6 | 31.281 | 821.67440 | 1.50000 | 1.763850 | 48.49 |
|   | 7 | 30.608 | 59.52783 | 4.53000 |   |   |
|   | 8 | 30.625 | −54.58139 | 1.50000 | 1.496999 | 81.54 |
|   | 9 | 31.792 | 85.47252 | 3.50000 | 1.854780 | 24.80 |
|   | 10 | 32.013 | 1,746.27160 | Variable |   |   |
| 3 | 11 | 34.266 | 51.38862 | 6.30000 | 1.496999 | 81.54 |
|   | 12 | 34.079 | −105.97960 | 0.20000 |   |   |
|   | 13 | 32.907 | 62.84264 | 5.70000 | 1.603420 | 38.03 |
|   | 14 | 32.181 | −77.96690 | 1.50000 | 1.953750 | 32.32 |
|   | 15 | 31.187 | 131.58754 | 5.00000 |   |   |
|   | 16P | 30.188 | 0.00000 | Variable |   |   |
| 4 | 17 | 24.338 | −39.36931 | 1.20000 | 1.487490 | 70.23 |
|   | 18 | 24.603 | −252.01580 | Variable |   |   |
| 5 | 19 | 25.764 | −145.23763 | 4.15000 | 1.688931 | 31.07 |
|   | 20 | 26.106 | −37.72914 | 0.19750 |   |   |
|   | 21 | 25.227 | 116.60325 | 5.15000 | 1.487490 | 70.23 |
|   | 22 | 24.667 | −34.65104 | 1.20000 | 2.001000 | 29.13 |
|   | 23 | 24.703 | −173.94917 | 0.20000 |   |   |
|   | 24 | 24.433 | 46.46980 | 3.60000 | 1.496999 | 81.54 |
|   | 25 | 24.426 | −482.76616 | Variable |   |   |
| 6 | 26 | 23.752 | −186.96820 | 2.15000 | 1.728250 | 28.46 |
|   | 27 | 23.799 | −58.73677 | 1.00000 | 1.729160 | 54.67 |
|   | 28 | 23.927 | 54.03845 | Variable |   |   |

(Numerical Embodiment 1)

|   |    |        |            |          |          |       |
|---|----|--------|------------|----------|----------|-------|
| 7 | 29 | 27.869 | 89.24396   | 3.20000  | 1.613397 | 44.27 |
|   | 30 | 28.100 | −364.55329 | Variable |          |       |
| 8 | 31 | 31.817 | −64.47614  | 1.20000  | 1.496999 | 81.54 |
|   | 32 | 33.685 | 40.39510   | 4.20000  | 1.613397 | 44.27 |
|   | 33 | 34.010 | 113.77665  | Variable |          |       |

|                           | WIDE   | MIDDLE | TELE   |
|---------------------------|--------|--------|--------|
| Focal length              | 101.99 | 199.92 | 489.99 |
| F-number                  | 4.60   | 5.20   | 7.20   |
| Half angle of view (degrees) | 11.98 | 6.18 | 2.53 |
| Image height              | 21.64  | 21.64  | 21.64  |
| Total length of zoom lens | 222.94 | 272.65 | 312.20 |
| BF                        | 19.88  | 36.44  | 69.71  |
| d5                        | 6.52   | 56.23  | 95.77  |
| d10                       | 29.25  | 20.89  | 1.50   |
| d16                       | 14.22  | 20.09  | 29.70  |
| d18                       | 16.98  | 11.11  | 1.50   |
| d25                       | 21.93  | 16.69  | 2.95   |
| d28                       | 9.85   | 15.09  | 28.83  |
| d30                       | 25.54  | 17.33  | 3.46   |
| d33                       | 19.88  | 36.44  | 69.71  |

Lens unit data

| Unit | First surface | Focal length |
|------|---------------|--------------|
| 1    | 1             | 201.05       |
| 2    | 6             | −57.06       |
| 3    | 11            | 75.72        |
| 4    | 17            | −95.89       |
| 5    | 19            | 49.13        |
| 6    | 26            | −57.14       |
| 7    | 29            | 117.19       |
| 8    | 31            | −97.08       |

(Numerical Embodiment 2)

| B | S   | EA     | R          | d        | nd       | vd    |
|---|-----|--------|------------|----------|----------|-------|
|   | obj |        |            | 1.00E+030|          |       |
| 1 | 1   | 61.718 | 99.62096   | 6.80000  | 1.496999 | 81.54 |
|   | 2   | 61.140 | 582.13808  | 0.20000  |          |       |
|   | 3   | 60.301 | 123.73404  | 2.70000  | 1.763850 | 48.49 |
|   | 4   | 58.040 | 62.38390   | 9.65000  | 1.438750 | 94.66 |
|   | 5   | 57.394 | 1,018.78827| Variable |          |       |
| 2 | 6   | 29.799 | 1,151.87324| 1.50000  | 1.729157 | 54.68 |
|   | 7   | 29.239 | 64.84721   | 3.70000  |          |       |
|   | 8   | 29.245 | −62.35096  | 1.82000  | 1.496999 | 81.54 |
|   | 9   | 30.080 | 89.65084   | 3.50000  | 1.854780 | 24.80 |
|   | 10  | 30.256 | 616.27278  | Variable |          |       |
| 3 | 11  | 31.681 | 46.43867   | 5.80000  | 1.496999 | 81.54 |
|   | 12  | 31.454 | −116.14509 | 0.20000  |          |       |
|   | 13  | 30.502 | 67.82771   | 5.00000  | 1.603420 | 38.03 |
|   | 14  | 29.828 | −77.67994  | 1.50000  | 1.953750 | 32.32 |
|   | 15  | 29.003 | 155.50421  | 1.67730  |          |       |
|   | 16P | 28.737 | 0.00000    | Variable |          |       |
| 4 | 17  | 23.103 | −40.44910  | 1.20000  | 1.618000 | 63.40 |
|   | 18  | 23.299 | −282.96587 | Variable |          |       |
| 5 | 19  | 25.010 | −124.04112 | 3.65000  | 2.001000 | 29.13 |
|   | 20  | 25.386 | −41.00291  | 0.20000  |          |       |
|   | 21  | 24.420 | 103.92532  | 5.00000  | 1.496999 | 81.54 |
|   | 22  | 24.434 | −35.65560  | 1.20000  | 2.001000 | 29.13 |
|   | 23  | 25.000 | −245.85587 | 0.20000  |          |       |
|   | 24  | 25.679 | 42.58086   | 4.40000  | 1.496999 | 81.54 |
|   | 25  | 25.614 | −169.09901 | 1.20000  | 1.698947 | 30.13 |
|   | 26  | 25.596 | −532.17547 | Variable |          |       |
| 6 | 27  | 24.698 | −378.04536 | 3.15000  | 1.720467 | 34.71 |
|   | 28  | 24.692 | −43.70174  | 1.00000  | 1.755000 | 52.32 |
|   | 29  | 24.727 | 44.72053   | Variable |          |       |
| 7 | 30  | 27.995 | 74.06786   | 3.50000  | 1.613397 | 44.27 |
|   | 31  | 28.240 | −274.97738 | Variable |          |       |

(Numerical Embodiment 2)

|   |    |        |           |          |          |       |
|---|----|--------|-----------|----------|----------|-------|
| 8 | 32 | 30.557 | −57.79085 | 1.20000  | 1.496999 | 81.54 |
|   | 33 | 32.556 | 37.01339  | 4.40000  | 1.613397 | 44.27 |
|   | 34 | 32.901 | 111.68481 | Variable |          |       |

|                           | WIDE   | MIDDLE | TELE   |
|---------------------------|--------|--------|--------|
| Focal length              | 82.24  | 199.92 | 395.00 |
| F-number                  | 4.10   | 5.13   | 6.40   |
| Half angle of view (degrees) | 14.74 | 6.18 | 3.14 |
| Image height              | 21.64  | 21.64  | 21.64  |
| Total length of zoom lens | 204.12 | 265.26 | 294.22 |
| BF                        | 21.72  | 43.37  | 68.86  |
| d5                        | 2.91   | 64.05  | 93.00  |
| d10                       | 36.71  | 21.44  | 2.54   |
| d16                       | 11.89  | 19.42  | 26.09  |
| d18                       | 15.99  | 8.47   | 1.79   |
| d26                       | 16.76  | 10.27  | 2.30   |
| d29                       | 7.26   | 13.74  | 21.71  |
| d31                       | 16.53  | 10.16  | 3.57   |
| d34                       | 21.72  | 43.37  | 68.86  |

Lens unit data

| Unit | First surface | Focal length |
|------|---------------|--------------|
| 1    | 1             | 209.37       |
| 2    | 6             | −61.89       |
| 3    | 11            | 71.43        |
| 4    | 17            | −76.51       |
| 5    | 19            | 43.43        |
| 6    | 27            | −50.85       |
| 7    | 30            | 95.49        |
| 8    | 32            | −90.54       |

(Numerical Embodiment 3)

| B | S   | EA     | R            | d        | nd       | vd    |
|---|-----|--------|--------------|----------|----------|-------|
|   | obj |        |              | 1.00E+030|          |       |
| 1 | 1   | 81.944 | 110.57800    | 9.00000  | 1.496999 | 81.54 |
|   | 2   | 81.183 | 459.98551    | 0.20000  |          |       |
|   | 3   | 79.287 | 103.75750    | 2.80000  | 1.834807 | 42.73 |
|   | 4   | 75.859 | 68.35747     | 13.00000 | 1.438750 | 94.66 |
|   | 5   | 74.727 | 374.50567    | Variable |          |       |
| 2 | 6   | 36.252 | 52.57731     | 6.30000  | 1.592701 | 35.31 |
|   | 7   | 34.617 | 1,929.09287  | 1.60000  | 1.903660 | 31.32 |
|   | 8   | 33.144 | 73.91283     | 5.25000  |          |       |
|   | 9   | 31.795 | −2,163.55016 | 1.20000  | 1.834807 | 42.73 |
|   | 10  | 31.043 | 53.93252     | 3.80000  |          |       |
|   | 11  | 31.074 | −97.72988    | 1.20000  | 1.438750 | 94.66 |
|   | 12  | 31.942 | 51.30459     | 3.20000  | 1.854780 | 24.80 |
|   | 13  | 31.919 | 138.06106    | Variable |          |       |
| 3 | 14  | 32.656 | 52.99698     | 5.50000  | 1.438750 | 94.66 |
|   | 15  | 32.555 | −137.02093   | 1.00000  |          |       |
|   | 16P | 32.198 | 0.00000      | Variable |          |       |
| 4 | 17  | 30.973 | −46.34133    | 1.50000  | 1.696800 | 55.46 |
|   | 18  | 31.499 | −71.62486    | Variable |          |       |
| 5 | 19  | 32.206 | 134.18919    | 4.80000  | 1.496999 | 81.54 |
|   | 20  | 32.132 | −64.88841    | 1.35000  |          |       |
|   | 21  | 30.067 | 39.69646     | 5.70000  | 1.698947 | 30.13 |
|   | 22  | 28.930 | −184.31386   | 1.20000  | 1.953750 | 32.32 |
|   | 23  | 26.598 | 25.87467     | 2.00000  |          |       |
|   | 24  | 27.155 | 27.34908     | 8.20000  | 1.613397 | 44.27 |
|   | 25  | 26.401 | −53.17974    | 1.20000  | 1.903660 | 31.32 |
|   | 26  | 26.061 | −227.10230   | Variable |          |       |
| 6 | 27  | 21.137 | 62.79556     | 3.40000  | 1.647689 | 33.79 |
|   | 28  | 20.588 | −65.32093    | 1.00000  | 1.804000 | 46.58 |
|   | 29  | 20.417 | 35.63549     | Variable |          |       |
| 7 | 30  | 29.424 | 121.21272    | 1.20000  | 2.000690 | 25.46 |
|   | 31  | 29.566 | 69.69479     | 6.20000  | 1.516330 | 64.14 |
|   | 32  | 30.075 | −46.29201    | Variable |          |       |

-continued (Numerical Embodiment 3)

| 8 | 33 | 30.624 | −88.19112 | 1.40000 | 1.496999 | 81.54 |
|---|---|---|---|---|---|---|
|   | 34 | 31.284 | 51.81510 | 4.40000 |   |   |
|   | 35 | 31.404 | −70.77038 | 1.80000 | 1.496999 | 81.54 |
|   | 36 | 34.451 | 64.33339 | 5.00000 | 1.720467 | 34.71 |
| 37 |   | 35.169 | −233.00505 | Variable |   |   |

|  | WIDE | MIDDLE | TELE |
|---|---|---|---|
| Focal length | 120.00 | 300.00 | 590.00 |
| F-number | 4.60 | 5.67 | 7.20 |
| Half angle of view (degrees) | 10.22 | 4.12 | 2.10 |
| Image height | 21.64 | 21.64 | 21.64 |
| Total length of zoom lens | 240.18 | 308.74 | 335.29 |
| BF | 15.00 | 36.91 | 73.64 |
| d5 | 1.00 | 69.56 | 96.11 |
| d13 | 33.82 | 20.56 | 1.50 |
| d16 | 6.33 | 11.38 | 11.60 |
| d18 | 9.34 | 4.29 | 4.07 |
| d26 | 16.65 | 9.43 | 2.00 |
| d29 | 22.71 | 35.80 | 40.97 |
| d32 | 30.93 | 16.41 | 1.00 |
| d37 | 15.00 | 36.91 | 73.64 |

Lens unit data

| Unit | First surface | Focal length |
|---|---|---|
| 1 | 1 | 213.95 |
| 2 | 6 | −56.08 |
| 3 | 14 | 87.88 |
| 4 | 17 | −193.11 |
| 5 | 19 | 72.64 |
| 6 | 27 | −71.38 |
| 7 | 30 | 80.79 |
| 8 | 33 | −64.86 |

(Numerical Embodiment 4)

| B | S | EA | R | d | nd | vd |
|---|---|---|---|---|---|---|
|   | obj |   | 0.00000 | 1.00E+030 |   |   |
| 1 | 1 | 92.325 | 117.11037 | 11.00000 | 1.496999 | 81.54 |
|   | 2 | 91.468 | 675.63817 | 0.20000 |   |   |
|   | 3 | 88.985 | 121.89525 | 2.80000 | 1.804000 | 46.58 |
|   | 4 | 84.602 | 72.02509 | 14.50000 | 1.438750 | 94.66 |
|   | 5 | 83.451 | 324.48750 | Variable |   |   |
| 2 | 6 | 45.970 | 73.30974 | 5.50000 | 1.688931 | 31.07 |
|   | 7 | 44.779 | 379.10737 | 1.60000 | 1.854780 | 24.80 |
|   | 8 | 43.304 | 101.19945 | 30.10194 |   |   |
|   | 9 | 30.609 | −1,040.89449 | 1.20000 | 1.834807 | 42.73 |
|   | 10 | 29.730 | 45.80637 | 4.45000 |   |   |
|   | 11 | 29.778 | −68.44596 | 1.20000 | 1.438750 | 94.66 |
|   | 12 | 31.027 | 49.81482 | 3.60000 | 1.854780 | 24.80 |
|   | 13 | 31.081 | 190.86160 | Variable |   |   |
| 3 | 14 | 31.717 | 54.82919 | 6.30000 | 1.438750 | 94.66 |
|   | 15 | 31.604 | −76.60090 | 1.00000 |   |   |
|   | 16P | 30.933 | 0.00000 | Variable |   |   |
| 4 | 17 | 30.127 | −43.49163 | 1.50000 | 1.910820 | 35.25 |
|   | 18 | 30.832 | −73.58490 | Variable |   |   |
| 5 | 19 | 31.838 | 145.84020 | 5.20000 | 1.496999 | 81.54 |
|   | 20 | 31.877 | −57.16854 | 7.65000 |   |   |
|   | 21 | 28.622 | 47.42287 | 6.00000 | 1.698947 | 30.13 |
|   | 22 | 27.597 | −72.52126 | 1.20000 | 1.910820 | 35.25 |
|   | 23 | 25.819 | 29.09106 | 2.30000 |   |   |
|   | 24 | 26.479 | 30.44414 | 7.90000 | 1.613397 | 44.27 |
|   | 25 | 25.896 | −45.75407 | 1.20000 | 2.001000 | 29.13 |
|   | 26 | 25.802 | −123.35835 | Variable |   |   |
| 6 | 27 | 20.840 | 112.27692 | 3.25000 | 1.595509 | 39.24 |
|   | 28 | 20.345 | −50.25463 | 1.00000 | 1.729157 | 54.68 |
|   | 29 | 19.647 | 49.41784 | Variable |   |   |
| 7 | 30 | 28.210 | 70.81118 | 1.20000 | 2.001000 | 29.13 |
|   | 31 | 28.099 | 42.48863 | 6.55000 | 1.517417 | 52.43 |
|   | 32 | 28.456 | −54.22485 | Variable |   |   |

-continued (Numerical Embodiment 4)

| 8 | 33 | 26.858 | −101.46774 | 1.40000 | 1.496999 | 81.54 |
|---|---|---|---|---|---|---|
|   | 34 | 27.127 | 45.72552 | 9.55000 |   |   |
|   | 35 | 29.468 | −56.13481 | 1.80000 | 1.496999 | 81.54 |
|   | 36 | 32.392 | 52.81373 | 5.90000 | 1.613397 | 44.27 |
| 37 |   | 33.196 | −114.69704 | Variable |   |   |

|  | WIDE | MIDDLE | TELE |
|---|---|---|---|
| Focal length | 199.97 | 399.99 | 784.76 |
| F-number | 6.00 | 6.80 | 8.50 |
| Half angle of view (degrees) | 6.17 | 3.10 | 1.58 |
| Image height | 21.64 | 21.64 | 21.64 |
| Total length of zoom lens | 285.44 | 355.65 | 385.65 |
| BF | 22.57 | 43.72 | 83.86 |
| d5 | 1.50 | 71.71 | 101.71 |
| d13 | 19.10 | 17.10 | 1.50 |
| d16 | 5.68 | 7.81 | 8.49 |
| d18 | 4.81 | 2.68 | 2.00 |
| d26 | 16.47 | 6.68 | 2.00 |
| d29 | 29.22 | 38.76 | 38.05 |
| d32 | 39.04 | 20.14 | 1.00 |
| d37 | 22.57 | 43.72 | 83.86 |

Lens unit data

| Unit | First surface | Focal length |
|---|---|---|
| 1 | 1 | 258.64 |
| 2 | 6 | −55.19 |
| 3 | 14 | 73.91 |
| 4 | 17 | −119.60 |
| 5 | 19 | 72.50 |
| 6 | 27 | −84.04 |
| 7 | 30 | 82.00 |
| 8 | 33 | −60.14 |

TABLE 1

|   | Conditional Expression | Embodiment 1 | Embodiment 2 | Embodiment 3 | Embodiment 4 |
|---|---|---|---|---|---|
| 1 | m5/m7 | 1.000 | 1.000 | 1.126 | 0.757 |
| 2 | m8/bfw | 2.170 | 2.507 | 3.910 | 2.715 |
| 3 | \|Es1\| | 7.856 | 8.029 | 8.539 | 8.966 |
| 4 | \|Es2/Es1\| | 0.314 | 0.322 | 0.214 | 0.422 |

Next, an example of a digital still camera in which the zoom lens according to any one of Embodiments of the disclosure is used as an image pickup optical system is described with reference to FIG. 10. In FIG. 10, the digital still camera includes a camera main body 10 and an image pickup optical system 11 consisting of any one of the zoom lenses described in Embodiments 1 to 4. An image pickup element (photoelectric conversion element) 12, for example, a CCD sensor or a CMOS sensor, is included in the camera main body 10 to receive an object image formed by the image pickup optical system 11.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-008874, filed Jan. 23, 2019, which is hereby incorporated by reference herein in its entirety.

What is claimed is:

1. A zoom lens comprising, in order from an object side to an image side:
   a first lens unit having a positive refractive power;
   a second lens unit having a negative refractive power;

a third lens unit having a positive refractive power;
a fourth lens unit having a negative refractive power;
a fifth lens unit having a positive refractive power;
a sixth lens unit having a negative refractive power;
a seventh lens unit having a positive refractive power; and
an eighth lens unit having a negative refractive power,
wherein an interval between each pair of adjacent lens units is changed for zooming, and
wherein the eighth lens unit includes a positive lens and a negative lens.

2. The zoom lens according to claim 1, wherein the first lens unit is moved toward the object side for zooming from a wide angle end to a telephoto end.

3. The zoom lens according to claim 1, wherein the fourth lens unit and the sixth lens unit are moved for zooming.

4. The zoom lens according to claim 1, wherein an interval between the first lens unit and the second lens unit at a telephoto end is wider than the interval at a wide angle end.

5. The zoom lens according to claim 1, wherein an interval between the second lens unit and the third lens unit is reduced for zooming from a wide angle end to a telephoto end.

6. The zoom lens according to claim 1, wherein an interval between the seventh lens unit and the eighth lens unit is reduced for zooming from a wide angle end to a telephoto end.

7. The zoom lens according to claim 1, wherein two lens units arranged on the image side of the second lens unit are moved for focusing.

8. The zoom lens according to claim 7, wherein the fourth lens unit and the sixth lens unit are moved for focusing.

9. The zoom lens according to claim 8, wherein the fourth lens unit is moved toward the object side for focusing on from an object at infinity to an object at close distance, and the sixth lens unit is moved toward the image side for focusing on from the object at infinity to the object at close distance.

10. The zoom lens according to claim 8, wherein each of the fourth lens unit and the sixth lens unit consists of two or less lenses.

11. The zoom lens according to claim 1, wherein the third lens unit and the fifth lens unit are moved along a same locus for zooming.

12. The zoom lens according to claim 1, wherein the following inequality is satisfied:

$$0.5 < m5/m7 < 1.5,$$

where m5 represents a movement amount of the fifth lens unit for zooming from a wide angle end to a telephoto end, and m7 represents a movement amount of the seventh lens unit for zooming from the wide angle end to the telephoto end.

13. The zoom lens according to claim 1, wherein the following inequality is satisfied:

$$1.2 < m8/bfw < 7.0,$$

where bfw represents a back focus at a wide angle end, and m8 represents a movement amount of the eighth lens unit for zooming from the wide angle end to a telephoto end.

14. The zoom lens according to claim 1,
wherein the fourth lens unit and the sixth lens unit are moved for focusing, one of the fourth lens unit and the sixth lens unit that has a higher focus sensitivity is defined as a focus lens unit, and another one of the fourth lens unit and the sixth lens unit that has a lower focus sensitivity is defined as a floating lens unit, and
wherein the following inequality is satisfied:

$$5 < |Es1| < 12,$$

where Es1 represents a focus sensitivity of the focus lens unit at a telephoto end when the zoom lens is focused at infinity.

15. The zoom lens according to claim 1,
wherein the fourth lens unit and the sixth lens unit are moved for focusing, one of the fourth lens unit and the sixth lens unit that has a higher focus sensitivity is defined as a focus lens unit, and another one of the fourth lens unit and the sixth lens unit that has a lower focus sensitivity is defined as a floating lens unit, and
wherein the following inequality is satisfied:

$$0.1 < |Es2/Es1| < 0.8,$$

where Es1 represents a focus sensitivity of the focus lens unit at a telephoto end when the zoom lens is focused at infinity, and Es2 represents a focus sensitivity of the floating lens unit at the telephoto end when the zoom lens is focused at infinity.

16. The zoom lens according to claim 1, wherein the fourth lens unit is moved toward the object side for focusing on from an object at infinity to an object at close distance, and the sixth lens unit is moved toward the image side for focusing on from the object at infinity to the object at close distance.

17. The zoom lens according to claim 1, wherein the third lens unit to the eighth lens unit are moved toward the object side for zooming from a wide angle end to a telephoto end.

18. An image pickup apparatus comprising:
the zoom lens according to claim 1; and
an image pickup element that receives an image formed by the zoom lens.

19. A lens apparatus comprising:
the zoom lens according to claim 1;
a first moving mechanism that causes the third lens unit, the fourth lens unit, and the fifth lens unit to move along a same locus in an optical axis direction; and
a second moving mechanism that causes the fourth lens unit to move along a locus that is different from loci of the third lens unit and the fifth lens unit in the optical axis direction.

20. The lens apparatus according to claim 19, comprising a third moving mechanism that causes the sixth lens unit to move in the optical axis direction,
wherein the first moving mechanism causes the sixth lens unit to move along the same locus as loci of the third lens unit, the fourth lens unit, and the fifth lens unit, and
wherein the third moving mechanism causes the sixth lens unit to move along a locus that is different from the loci of the third lens unit, the fourth lens unit, and the fifth lens unit.

* * * * *